(12) United States Patent
Hayes (10) Patent No.: US 11,514,475 B2
(45) Date of Patent: Nov. 29, 2022

(54) SYSTEMS, METHODS, AND COMPUTER PROGRAM PRODUCTS FOR PROVIDING DATA USE OPTIONS

(71) Applicant: Google LLC, Mountain View, CA (US)

(72) Inventor: Thomas B. Hayes, Dallas, TX (US)

(73) Assignee: GOOGLE LLC, Mountain View, CA (US)

( * ) Notice: Subject to any disclaimer, the term of this patent is extended or adjusted under 35 U.S.C. 154(b) by 1942 days.

(21) Appl. No.: 14/551,752

(22) Filed: Nov. 24, 2014

(65) Prior Publication Data

US 2015/0220989 A1 Aug. 6, 2015

Related U.S. Application Data

(60) Provisional application No. 61/935,023, filed on Feb. 3, 2014.

(51) Int. Cl.
*G06Q 30/00* (2012.01)
*G06Q 30/02* (2012.01)

(52) U.S. Cl.
CPC ..... *G06Q 30/0261* (2013.01); *G06Q 30/0235* (2013.01)

(58) Field of Classification Search
CPC ................. G06Q 30/02; G06Q 30/0207–0277
See application file for complete search history.

(56) References Cited

U.S. PATENT DOCUMENTS

2001/0005834 A1* 6/2001 Simpson ............ G11B 33/0427
705/14.1
2003/0004802 A1* 1/2003 Callegari ............... G06Q 30/02
705/14.13

(Continued)

FOREIGN PATENT DOCUMENTS

WO 2015/116309 A1 8/2015

OTHER PUBLICATIONS

Telcontar: Telcontar and oracle put location-based services on hte map; companies collaborating to create a framework for rapid location-based services development and deployment. (Dec. 13, 2001). M2 Presswire Retrieved from http://dialog.proquest.com (Year: 2001).*

(Continued)

*Primary Examiner* — Kambiz Abdi
*Assistant Examiner* — Christopher Stroud
(74) *Attorney, Agent, or Firm* — Dority & Manning, P.A.

(57) ABSTRACT

Systems, methods, and computer program products are provided for location-based distribution of data. One or more sets of data from one of a plurality of partner systems are received and stored, each set of data including at least one of a location data and a range. Application information associated with each application of a plurality of applications stored on respective mobile device is retrieved. The application information includes at least application location information. A pool of eligible applications are identified from the plurality of applications, based on the application location information of each of the plurality of applications and at least one of the location data and range of one of the one or more sets of data. A message is generated for each of the applications in the pool of eligible applications, the message including at least a portion of the one of the one or more sets of data. The respective messages are transmitted over a communications network to the applications in the pool of eligible applications.

18 Claims, 5 Drawing Sheets

(56) References Cited

U.S. PATENT DOCUMENTS

| | | | |
|---|---|---|---|
| 2008/0010196 A1* | 1/2008 | Rackley III | G06Q 20/102 |
| | | | 705/40 |
| 2008/0126145 A1* | 5/2008 | Rackley III | G06Q 20/102 |
| | | | 455/406 |
| 2008/0214166 A1 | 9/2008 | Ramer et al. | |
| 2009/0150218 A1* | 6/2009 | Brunner | G06Q 30/02 |
| | | | 705/14.58 |
| 2009/0199114 A1* | 8/2009 | Lewis | G06Q 30/02 |
| | | | 715/763 |
| 2011/0191181 A1* | 8/2011 | Blackhurst | G06Q 30/0255 |
| | | | 705/14.53 |
| 2011/0270618 A1* | 11/2011 | Banerjee | G06Q 30/02 |
| | | | 705/1.1 |
| 2012/0101881 A1* | 4/2012 | Taylor | G06Q 20/12 |
| | | | 705/14.13 |
| 2012/0150598 A1* | 6/2012 | Griggs | G06Q 30/0214 |
| | | | 705/14.16 |
| 2012/0221392 A1 | 8/2012 | Baker et al. | |
| 2012/0330737 A1 | 12/2012 | Liberty | |
| 2013/0073377 A1 | 3/2013 | Heath | |
| 2013/0218657 A1* | 8/2013 | Salmon | G06Q 10/00 |
| | | | 705/14.29 |
| 2013/0260734 A1 | 10/2013 | Jain et al. | |

OTHER PUBLICATIONS

DeCarta empowers developers to integrate location-based services into their kindle-based applications. (Mar. 6, 2012). PR Newswire Retrieved from http://dialog.proquest.com (Year: 2012).*
https://web.archive.org/web/19970606031312/http://www.mapquest.com (Year: 1997).*
https://web.archive.org/web/20011107010800/http://www.mapquest.com (Year: 2001).*
https://web.archive.org/web/19990208021627/http://www02.mapquest.com/ (Year: 1999).*
https://web.archive.org/web/20010628105444/http://www.mapquest.com/ (Year: 2001).*
https://web.archive.org/web/20080503071731/http://www.mapquest.com/ (Year: 2008).*
https://web.archive.org/web/20090716093748/http://www.mapquest.com/ (Year: 2009).*
https://web.archive.org/web/20100207172127/http://www.mapquest.com/360-details (Year: 2010).*
Bai, "International Preliminary Report on Patentability issued in International Application No. PCT/US2014/067111", dated Aug. 18, 2016, 7 pages.
Jang, "International Search Report and Written Opinion issued in International Application No. PCT/US2014/067111", dated Feb. 27, 2015, 14 pages.

* cited by examiner

SYSTEMS, METHODS, AND COMPUTER PROGRAM PRODUCTS FOR PROVIDING DATA USE OPTIONS

CROSS REFERENCE TO RELATED APPLICATION

This application claims priority to U.S. Provisional Application No. 61/935,023, filed Feb. 3, 2014, the contents of which are incorporated herein by reference.

BACKGROUND

1. Field

The present invention relates to distribution of data, and more particularly to systems, methods, and computer program products for providing location-based distribution of data.

2. Related Art

Merchants often operate under very low margins. As such, the objective of any merchant is to get inventory available for sale, sold, and restocked as quickly as possible.

To that end, management of inventory and supply chain (the system of organizations, people, activities, information, and resources involved in moving a product or service from supplier to sale) is vital to success. For example, it is important to move inventory to locations which are lacking in such inventory, so that the inventory can be stocked and sold. Otherwise, the merchant misses out on a sale (or, often, multiple sales). Inventory may also be moved for other considerations. For example, a merchant may want to move inventory out of a location with excess inventory by increasing sales at that location, rather than paying overhead costs involved in moving the inventory to other locations.

In that regard, the increase in mobile devices allows for increased flexibility for inventory management. For example, since a mobile device may move in and out of different locations, there is a need to alert the mobile device of sales in a particular location or locations, based on where the inventory is or needs to be sold. On the other hand, since sales are often completed online with a mobile device without visiting a store, there is also a need to facilitate online sales while accounting for location-based inventory concerns (e.g., offering online sales only to devices near locations where excess inventory exists and/or can be shipped from cheaply).

Thus, one technical challenge involves providing data such as offers from merchant systems to mobile devices and/or applications based on the location of the mobile device and/or application.

BRIEF DESCRIPTION

The example embodiments presented herein address the above-identified needs by providing systems, methods, and computer program products for providing location-based distribution of data.

In one embodiment, a system is provided for location-based distribution of data. The system includes at least one memory operable to store one or more sets of data received from one of a plurality of partner systems, each set of data including at least one of a location data and a range, and a processor coupled to the memory. The processor is operable to retrieve application information associated with each application of a plurality of applications stored on respective mobile devices, the application information including at least application location information. The processor is further operable to identify a pool of eligible applications from the plurality of applications, based on the application location information of each of the plurality of applications and at least one of the location data and range of one of the one or more sets of data. The processor is also operable to generate a message for each of the applications in the pool of eligible applications, the message including at least a portion of the one of the one or more sets of data, and to transmit the respective message, over a communications network, to the applications in the pool of eligible applications.

In another embodiment, a method is provided for location-based distribution of data. One or more sets of data from one of a plurality of partner systems are received and stored, each set of data including at least one of a location data and a range. Application information associated with each application of a plurality of applications stored on respective mobile device is retrieved. The application information includes at least application location information. A pool of eligible applications are identified from the plurality of applications, based on the application location information of each of the plurality of applications and at least one of the location data and range of one of the one or more sets of data. A message is generated for each of the applications in the pool of eligible applications, the message including at least a portion of the one of the one or more sets of data. The respective messages are transmitted over a communications network to the applications in the pool of eligible applications.

In yet another embodiment, a non-transitory computer readable storage medium is provided having stored thereon instructions which, when executed by a system including at least one processor and at least one memory, cause the system to receive and store one or more sets of data from one of a plurality of partner systems, each set of data including at least one of a location data and a range. The instructions further cause the system to retrieve application information associated with each application of a plurality of applications stored on respective mobile devices, the application information including at least application location information, and cause the system to identify a pool of eligible applications from the plurality of applications, based on the application location information of each of the plurality of applications and at least one of the location data and range of one of the one or more sets of data. The instructions additionally cause the system to generate a message for each of the applications in the pool of eligible applications, the message including at least a portion of the one of the one or more sets of data. The instructions also cause the system to transmit the respective message over a communications network to the applications in the pool of eligible applications.

BRIEF DESCRIPTION OF THE DRAWINGS

The features and advantages of the present invention will become more apparent from the detailed description set forth below when taken in conjunction with the following drawings.

DETAILED DESCRIPTION

Overview

The example embodiments presented herein are directed to systems, methods, and computer program products for location-based distribution of data, which are described herein in terms of an example mobile commerce environment.

According to embodiments described herein, one or more sets of data (e.g., offers) including location data and a range are matched to location information of a plurality of applications stored on respective mobile devices, and the sets of data are transmitted to the applications over a network.

The features discussed above are described in further detail below, with reference to FIGS. 1-5.

It should be understood that while the invention is described below in the context of providing offers from merchants to mobile applications on mobile devices, any type of data may be distributed among any types of systems and/or devices, based on the location of one or more of the systems and/or devices.

The terms "wallet client", "mobile wallet application", or "mobile wallet" and/or the plural forms of these terms are used interchangeably herein to refer to a mobile wallet application deployed, stored and/or functioning on a mobile device.

System

Figure 1:
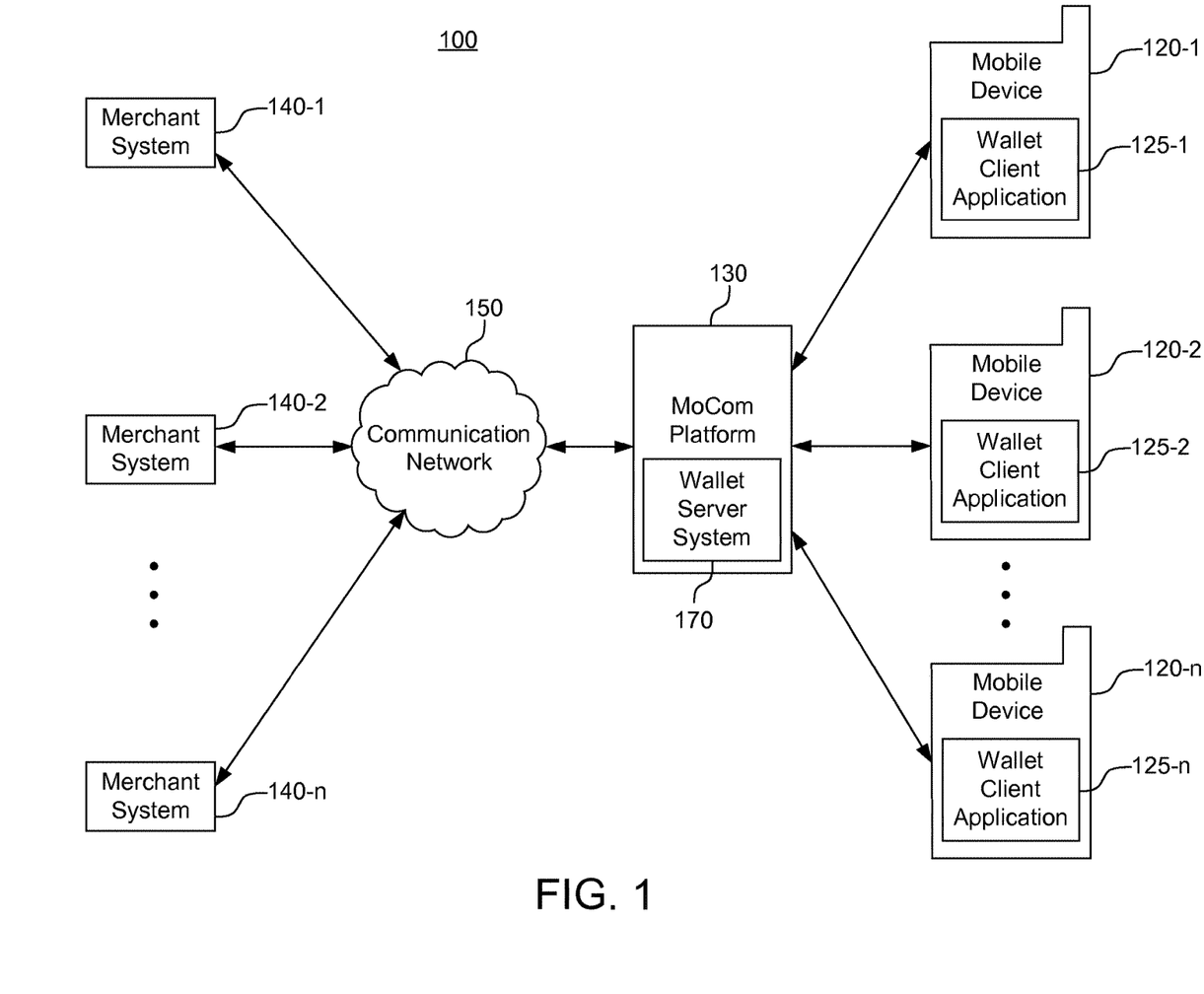
FIG. 1 is a diagram of a mobile commerce system for providing location-based distribution of data according to an exemplary embodiment.

FIG. 1 is a diagram of a system 100 for providing location-based distribution of data according to an exemplary embodiment. As shown in FIG. 1, system 100 includes mobile devices 120-1, 120-2, . . . , 120-*n* (collectively "120" or "mobile devices 120"); a mobile commerce (MoCom) platform 130 including a wallet server system 170; merchant systems 140-1, 140-2, . . . , 140-*n* (collectively "140" or "merchant systems 140"); and communication network 150.

Mobile devices 120 may be, for example, a cellular phone, tablet or the like. Each of mobile devices 120-1, 120-2, . . . , 120-*n* includes a processor, memory, and an output display such as a display screen, as described in more detail below with reference to FIG. 2. A secure element (SE) may be included in each mobile device, and may be implemented as a Universal Integrated Circuit Card (UICC), embedded SE card, secure micro secure digital (microSD) card, and the like. A secure element may also be implemented outside of the mobile device with which it is associated. For example, a secure element may be implemented in a cloud-based, remote or virtual storage, and the like.

Mobile devices 120-1, 120-2, . . . , 120-*n* include or have stored thereon a wallet client application 125-1, 125-2, . . . , 125-*n* (collectively "125" or "wallet client applications 125"), which include instructions that when executed by the processor of the corresponding mobile device 120, cause the mobile device to act as an instrument, for example, for processing contactless transactions.

Offers used during a transaction may be stored and managed by the MoCom platform 130. In one example embodiment, the MoCom platform 130 may include wallet server system 170. Wallet server system 170 is hardware and/or software for storing data associated with, for example, mobile devices 140, mobile network operators (MNOs), wallet client applications 125, secure elements, and the like. In one example embodiment, wallet server system 170 stores mobile wallet application profiles (e.g., for wallet client application 125-1), which may include mobile device, user, mobile wallet application and transaction data. Wallet server system 170 may also include one or more databases, such as an offer database for storing offers or offer data, and may be configured to manage (e.g., transmit, receive, request, process) offers and their related data. For example, wallet server system 170 may store and manage mobile commerce data (e.g., offer data, loyalty data, rewards data), merchant data (e.g., information related to merchants associated with commerce data), and rules and/or means for processing redeemed offers, distributing offers to wallet client applications, and the like, as described below in further detail with reference to FIG. 2.

MoCom platform 130 may be a standalone platform, or may be part of a mobile wallet system and/or architecture. The mobile wallet system and/or architecture may include various systems such as a trusted service manager (TSM) and/or an enterprise service bus (ESB). The ESB and TSM are systems that provide interfaces and/or communications means between multiple systems internal or external to the mobile wallet system and/or architecture, such as providing additional interfaces to facilitate payment and commerce transactions using wallet client applications 125.

MoCom platform 130 is communicatively coupled to merchant systems 140 over a communications network 150. A merchant system such as merchant system 140-1 is a system, platform, computer architecture or the like, managed by a partner and/or merchant (e.g., business, retailer). The merchant system may include a customer relationship marketing (CRM) system or logic, which is used to analyze, manage and distribute offers. In one exemplary embodiment, a merchant system creates an offer and transmits that offer to the MoCom platform 130 to be certified, configured, stored and/or distributed to wallet client applications 125 on mobile devices 120. The creation and management of offers is described in further detail in U.S. Patent Application Publication Nos. US 2014/0032312 and US 2014/0074616, which are incorporated herein by reference in their entirety.

Figure 2:
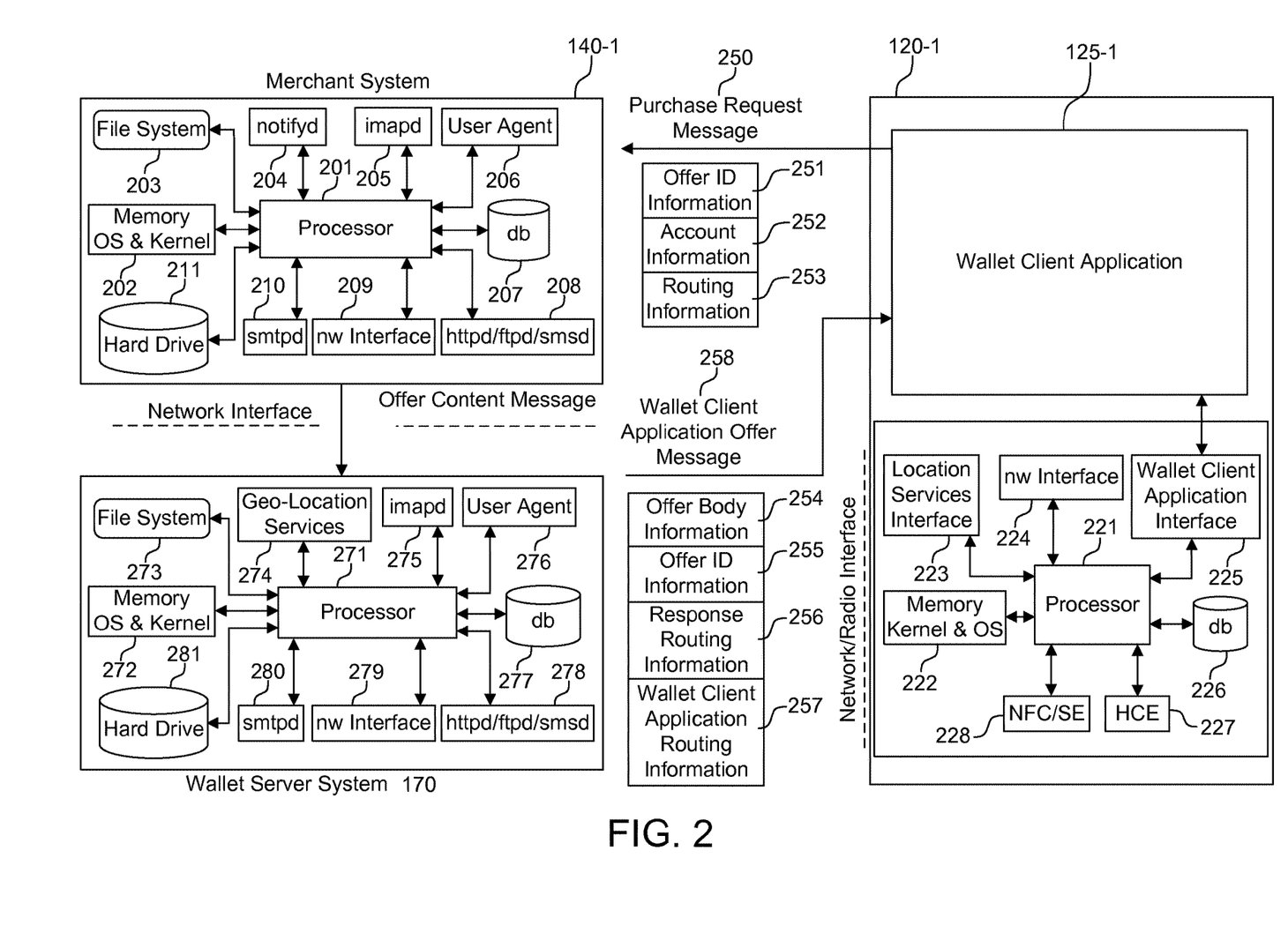
FIG. 2 is another diagram of the mobile commerce system for providing location-based distribution of data according to an exemplary embodiment.

FIG. 2 is a more detailed view of a merchant system (e.g., merchant system 140-1), a wallet server system (e.g., wallet server system 170) and a wallet client application (e.g., wallet client application 125-1) on a mobile device (e.g. mobile device 120-1) shown in FIG. 1. These elements and/or systems provide location-based distribution of data over communication network 150 according to an exemplary embodiment.

In particular, FIG. 2 illustrates networking tools used to enable distribution of merchant offers to wallet client applications 125 (or mobile devices 120). Although merchant system 140-1, wallet server system 170 and mobile device 120-1 are shown as single components communicating directly, it should be understood they may be part of a system of many such components which may be centrally located or dispersed geographically and connected through disparate networking systems, e.g., cloud computing services. In addition, each of the elements in FIG. 2 may be implemented by hardware, software, or some combination of the two.

Merchant system 140-1 includes the tools necessary to transfer offer content to a wallet server system 170, to in turn deploy the offer content to a wallet client application or applications (e.g., the wallet client application 125-1 on mobile device 120-1) which correspond to an offer campaign. For example, merchant system 140-1 may define an offer campaign in which offers are deployed only to mobile devices within a range of certain locations, as a means of moving inventory in and/or to those locations.

Merchant system 140-1 may include, for example, processor 201, which may be a central processing unit (CPU) or multiple CPUs, as hardware that carries out the instructions of a computer program by performing the arithmetical, logical, control and input/output operations of the system.

Merchant system 140-1 may further include memory operating system (OS) and kernel 202. The operating system is hardware and/or software which performs tasks such as recognizing input from input devices, sending output to other devices such as a display screen, keeping track of files and directories on a disk, and controlling peripheral devices such as disk drives and printers. The kernel is the central module of the OS. The kernel is generally the part of the operating system that loads first, and it remains in main memory. The kernel is responsible for memory management, process and task management, and disk management, and connects the system hardware to application software.

Additionally, merchant system 140-1 may include file system 203 as hardware and/or software for managing files in the system, and specifically for controlling how data is stored and retrieved. File system 203 may allocate space in a granular manner, and may use multiple physical units on the device. File system 203 is responsible for organizing files and directories, and keeping track of which areas of the media belong to which file and which are not being used.

Merchant system 140-1 may further include notifyd 204, which is hardware and/or software including a daemon (e.g., background process) for passing event notifications between processes and/or to the user. For example, notifyd 204 may generate small, passive popup dialogs that notify the user of particular events in an asynchronous manner.

Merchant system 140-1 may also include imapd 205, which is hardware and/or software for communicating via the Internet Message Access Protocol (IMAP). Generally, imapd runs automatically after receiving a network connection, accompanied by the appropriate userid and password, and manages incoming and outgoing mail in the IMAP format.

Additionally, merchant system 140-1 may include user agent 206, which is hardware and/or software for acting on behalf of a user. For example, user agent 206 may operate in a network protocol by identifying itself and its user, its application type, operating system, software vendor, or software revision, by submitting a characteristic identification string to its operating peer. In the context of merchant system 140-1, therefore, user agent 206 might act on behalf of the merchant user currently logged into the system, e.g., a manager at a store location.

Merchant system 140-1 may include database 207, which is hardware and/or software for storing an organized collection of data, typically organized to model aspects of reality in a way that supports processes requiring information. For example, database 207 may store data corresponding to offer content, prior to transmission to wallet server system 170.

Merchant system 140-1 may also include httpd/ftpd/smsd 208, which is hardware and/or software including a respective daemon (background process) for communicating via each of the Hypertext Transfer Protocol (http), File Transfer Protocol (ftp), or Short Message Service (sms) protocol. For example, httpd/ftpd/smsd 208 may create a pool of child processes or threads to handle http requests.

Merchant system 140-1 may further include network interface 209, which is a hardware and/or software interface between merchant system 140-1 and a network such as communication network 150. Thus, for example, network interface 209 may provide standardized functions such as passing messages, connecting and disconnecting, and the like.

Additionally, merchant system 140-1 may include smtpd 210, which is hardware and/or software including a daemon for communicating via Simple Mail Transfer Protocol (smtp). For example, smtpd 210 may listen for incoming mail and place it in a private queue.

Merchant system 140-1 may also include hard drive 211. Hard drive 211 is hardware and associated software acting as a data storage device for storing and retrieving digital information. Hard drive 211 retains its data even when powered off. While hard drive 211 is explained in the context of a hard disk, it should be understood that other persistent memory may be used, such as solid-state drives (SSDs).

As can be seen in FIG. 2, merchant system 140-1 transmits an offer content message including offer content to wallet server system 170.

Wallet server system 170 stores offer content received from merchant system 140-1. In that regard, the general structure and function of processor 271, memory OS and kernel 272, file system 273, imapd 275, httpd/ftpd/smsd 278, network interface 279 and smtpd 280 corresponds to the same elements described above with respect to merchant system 140-1, and as such for purposes of conciseness will not be repeated. Of course, it should be understood that the specific functions of these elements may be tailored to the functionality of wallet server system 170.

Wallet server system 170 further includes geo-location services 274, which is hardware and/or software which may store merchant defined location and range data defined by an offer for mobile devices 120 as targets of the offer, as shown below in Table 1. Geo-location services 274 may also include hardware and/or software for receiving and storing the location of mobile devices 120 (e.g., mobile device 120-1) and/or wallet client applications 125 (e.g., wallet client application 125-1) from location services 223 in mobile device 120-1. In that regard, mobile device 120-1 may ascertain its location with location services interface 223 as by using, e.g., Global Positioning System (GPS) coordinates or radio frequency (RF) location methods, and may periodically transmit such information to wallet server system 170. Alternatively, wallet server system 170 may periodically request such information from mobile device 120-1, e.g., when a new offer is received from merchant system 140-1.

Wallet server system 170 also includes a database 277 for storing offer content received from merchant systems such as merchant system 140-1, and wallet client application information identifying wallet client application 125-1. An example of offer content that might be stored in database 277 is depicted below in Table 1 ("Merchant Offer Content Table"). Database 277 may also store wallet client application information about a wallet client application (e.g., wallet client application 125-1) on a mobile device (e.g., mobile device 120-1), and may include associated wallet client application location data, such as that depicted below in Table 2 ("Wallet Client Application Location Table"). It should be understood that these tables are merely examples, and the type, volume, arrangement and identity of the stored information may vary.

Table 1 further includes Offer Content, which defines the actual bounds of the offer, and which may include the text transmitted to mobile devices 120 or wallet client applica-

TABLE 1

Merchant Offer Content Table (Online & Store Specific)

| Internal ID | Merchant Offer ID | Merchant Defined Location Data and Associated Range | Offer Content | Local Specific Store Data | Use Case |
|---|---|---|---|---|---|
| 99 | 16833456 | Zip Codes: 75202, 75203, 75206, 75208, etc . . . Latitude/Longitude: {32.56.2960, 96.49.1062} Latitude/Longitude Range: {34.36.4718, 96.49.1000; 32.55.3468, 94.50.1749; 31.16.0814, 96.49.1000; 32.55.3486, 98.47.9076} | Ace Laptop Computer $199.00 Valid Through Sep. 24, 2014 | {32.862845, −96.754540} {32.862845, −96.754540} | Online Only - Limited Physical Use Locations |
| 300 | 56892233 | National | Back to School Special Two General Purpose Backpacks $15.99 Valid Through Oct. 10, 2014 | {32.862845, −96.754540} {32.862845, −96.754540} {32.862845, −96.754540} {32.862845, −96.754540} | Online Only - Limited Physical Use Locations |
| 350 | 88963443A | Regional: TX, OK, LA, MISS, ARK | Main L-Shaped Desk and Hutch 124.00 | {32.862845, −96.754540} | Online Only - Limited Physical Use Locations |

TABLE 2

Wallet Client Application Location Table

| Internal ID | Location Data | Internal ID (from Table 1) |
|---|---|---|
| 88 | Latitude/Longitude: {32.56.2960, 96.49.1062} Zip Code: 75202 | 99 |
| 764 | Latitude/Longitude: {33.6790, −117.905635} Zip Code: 92626 | 300 |
| 1234 | Latitude/Longitude: {32.862845, 96.754540} Zip Code: 75201 | 350 |

As shown in Table 1, the merchant offer content might include an internal identification (ID), which is a number, letter, character string, or the like which identifies the offer within the wallet server system 170. The internal ID may be, for example, assigned upon reception of the corresponding offer.

A Merchant Offer ID may identify the offer at merchant system 140-1, or may identify the offer globally throughout the environment shown in FIG. 1.

Merchant Defined Location Data and Associated Range includes the geographic location and range where the offer is valid/to be transmitted. In that regard, the location and range can be defined in various ways. For example, as shown in Table 1, the location may be defined as a GPS coordinate, with the range being defined as a set of GPS coordinates surrounding or near the location coordinate. In another example, both the location and range may be defined using one or more zip codes, since zip codes have a predetermined range. The location and range could also be defined, as shown, by one or more states, countries (e.g. nationally), or other divisions.

tion 125 in a matching location. Thus, for example, offer content might include "Ace Laptop Computer—$199.00—Valid Through 09/24/14".

Local Specific Store Data may comprise a location or range from which the inventory may be shipped, e.g., in the case that a user of mobile device 120-1 or wallet client application 125-1 decides to accept the offer and purchase the product. As mentioned above, defining the locations from which purchased inventory can be shipped allows the merchant better control of inventory and supply chain logistics, for example by reducing excess inventory at certain locations.

Table 1 further includes a Use Case, which may be used to define additional conditions of the offer or how the offer may be used. For example, the Use Case may define the offer as online only, with shipping limited to certain physical locations.

As mentioned above, database 277 also stores wallet client application information about a wallet client application (e.g., wallet client application 125-1) on a mobile device (e.g., mobile device 120-1), and may include associated wallet client application location data, such as that in the Wallet Client Application Location Table (Table 2).

In that regard, Table 2 may store the internal ID of offers which match the current location of the wallet client application. An internal ID in this context may be a number, letter, character string, or the like in the wallet server which identifies the wallet client application (e.g., wallet client application 125-1), or the corresponding mobile device (e.g., mobile device 120-1).

Location Data defines the location of the wallet client application and mobile device. As with the location data and range of the offer itself, the location of the wallet client application and/or mobile device may be defined as a set of GPS coordinates, by using a zip code, by using political divisions such as cities, and the like.

The ID # from the Merchant Offers Table indicates an internal ID of an offer which matches the location data of the wallet client application and/or mobile device. As discussed below, this matching may be performed by user agent 276 of wallet server system 170. Thus, for example, since the location data of the wallet client application with internal ID 88 is within the location data and range defined by the offer with internal ID 99, these items are correlated by user agent 276, and added to Table 2 in database 277 as a match.

In more detail, communicated offer content received by the wallet server system 170 from merchant system 140-1 is stored within the wallet server database 277. Once an offer campaign is initiated, a user agent 276 of the wallet server system 170 compares wallet client application location data (e.g., the location data stored in Table 2 in database 277) with the location and range defined by the offer (e.g., the Merchant Defined Location Data and Associated Range data stored in Table 1 in database 277) to identify one or more wallet client applications on respective mobile devices (e.g., the wallet client application 125-1 on mobile device 120-1) which fall within the location and range defined by the offer. Thus, user agent 276 identifies a pool of eligible applications from the plurality of applications, based on the application location information of each of the plurality of applications and at least one of the location data and range of one of the one or more sets of data (e.g., offers).

Once corresponding merchant offers and wallet client applications are identified based on the comparison between the wallet client application location data and the location data and range of the offer, user agent 276 of wallet server system 170 retrieves wallet client application information of the eligible application(s) and/or corresponding mobile device(s), such as network address, port information, response routing information and offer content.

A communications message may then be generated by user agent 276, including network and application routing information, offer content (e.g. from Table 1 in database 277), and presentation information such as code or instructions for graphically displaying the offer on a mobile device, and sent to the wallet client application (e.g., wallet client application 125-1).

For example, a wallet client application offer message 258 may include a message body (offer body information 254), offer identification information 255 that may include an inventory location identifier, response routing information 256 which mobile device 120-1 can use to route a response back to the merchant system 140-1, and wallet client routing information 257 for routing the message to the wallet client application 125-1. The offer message 258 may include, in offer body information 254 or elsewhere, the location and range defined by the offer, store specific location data, and offer use capabilities and/or restrictions.

As shown in FIG. 2, mobile device 120-1 includes wallet client application 125-1 for causing the mobile device to act as an instrument, for example, for processing contactless transactions, as well as for presenting (e.g. displaying) offers or other sets of data received from wallet server system 170, as described more fully below.

Mobile device 120-1 further includes a processor 221, a memory kernel and OS 222, and network interface 224. In that regard, the general structure and function of processor 221, memory OS and kernel 222, and network interface 224 corresponds to the same elements described above with respect to merchant system 140-1, and as such for purposes of conciseness will not be repeated. Of course, it should be understood that the specific functions of these elements may be tailored to the functionality of mobile device 120-1.

Location services interface 223 is hardware and/or software for obtaining, e.g., location data of the mobile device 120-1, such as by, e.g., communication with a GPS satellite or RF location methods. Moreover, location services interface 223 may periodically transmit such information to wallet server system 170, so that wallet server system 170 can use this information in matching mobile device 120-1 to offers or other sets of data received from merchant system 140-1. Alternatively, location services interface 223 may respond to periodic queries from wallet server system 170 for such information.

User wallet client application interface 225 is hardware and/or software for interfacing the other components of mobile device 120-1 with wallet client application 125-1. For example, wallet client application 125-1 communicates with database 226 to obtain offer identification information (offer ID information 251) to transmit to merchant system 140-1 in the case that there is a selection of an offer on mobile device 120-1.

Database 226 is hardware and/or software for storing an organized collection of data, such as received offers and offer content transmitted from wallet server system 170.

Host-based Card Emulation (HCE) interface 227 is hardware and/or software for using the near field communications (NFC) interface on mobile device 120-1 to allow the mobile device 120-1 to act as a contactless card in order to, e.g. make a payment, present a ticket, show an ID card, and the like.

Mobile device 120-1 further includes near field communications (NFC)/SE 228. The NFC includes hardware and/or software for short-range wireless communication. The secure element (e.g., secure memory and execution environment) is a dynamic environment in which application code and application data can be securely stored and administered and in which secure execution of applications occurs. As described above with respect to FIG. 1, the secure element may be implemented as a UICC, embedded SE card, microSD card, and the like.

As can be seen in FIG. 2, a wallet client application offer message is transmitted from wallet server system 170 to wallet client application 125-1 on mobile device 120-1. As described above, a wallet client application offer message 258 comprises a message body (offer body information 254), offer identification information 255 that may include an inventory location identifier, response routing information 256 for routing a response to the merchant system 140-1, and wallet client routing information 257 for routing the message to the wallet client application. The offer message 258 may include, in offer body information 254 or elsewhere, the location and range defined by the offer, store specific location data, and offer use capabilities and/or restrictions.

As offers are received by the wallet client application 125-1 at mobile device 120-1, they are stored (e.g., into database 226). In response to a user of mobile device 120-1 requesting access to a user interface for accessing and viewing stored offers, offers are read from the database 226 or memory 222, encoded with presentation logic (e.g., data for appropriately displaying the offer), and written to an instance variable for display.

Offer message 258, and in particular offer body information 254, may include a first link for enabling online purchasing of the merchant identified product (including, e.g., the Merchant Offer ID from Table 1) and an optional second link for retrieving location information that identifies where use of the offer is valid for in-store use (e.g., stores corresponding to the "Local Specific Store Data" in Table 1).

The first link (online purchasing) is used by wallet client application interface 225 to obtain routing information 253. Routing information 253 is used for routing the message over a secure transport channel to either wallet server system 170 or the merchant server system 140-1. For example, routing information 253 identifies application resource management interfaces from a merchant system, wallet server system or both (e.g., an Internet Protocol (IP) address of web page from which a product may be purchased). Routing information 253 may be pre-stored based on, e.g., registering an account with the wallet server system 170, merchant system 140-1, or both, or may be received with offer content as response routing information 256. Wallet client application interface 225 further obtains user personal account information 252, such as billing and contact information, and payment credential information stored in memory, e.g., memory managed by the secure element, and offer identification information 251 (e.g., the same Merchant Offer ID identifying the offer at wallet server system 170 in Table 1).

A purchase request message 250 is generated by wallet client application 125-1, and includes relevant information such as offer identification information 251, account information 252, and routing information 253.

Once this information is received by the merchant system 140-1, the payment transaction can be procured using payment and/or commerce transaction machinery of merchant system 140-1.

For example, once the merchant system 140-1 retrieves the purchase request message 250, merchant resource management tools may retrieve an inventory location identifier (not shown), to complete the shipping requirements needed to complete the transaction. The inventory location identifier can be used by the merchant resource management tools to determine location(s) of the merchant's supply chain inventory from which the offered product can be shipped. Alternatively, the purchase request message 250 and offer identification information 251 can be transmitted to a specific merchant system application program interface (API) at merchant system 140-1, which determines from where the offered product within the supply chain is to be shipped. Thus, in this example, the specified merchant system API defines a specific resource management tool within the merchant inventory management system that, along with offer identification information 251, can be used to determine from where in the supply chain inventory is shipped.

As mentioned above, offer message 258 may also include a second link for retrieving location information that identifies where use of the offer is valid for in-store use (e.g., stores corresponding to the "Local Specific Store Data" in Table 1). The second link may be used by the wallet client application interface 225 to retrieve store location information for display by wallet client application 125-1 via a display of mobile device 120-1. The second link may be present when mobile device 120-1 is in a relevant location (e.g. a location within the Merchant Defined Location Data and Associated Range stored in Table 1), determined by a physical address, such as a zip code, or GPS coordinates. Thus, if the second link is selected, mobile device 120-1 displays in-store options for using the offer and predefined locations.

Process

Figure 3:
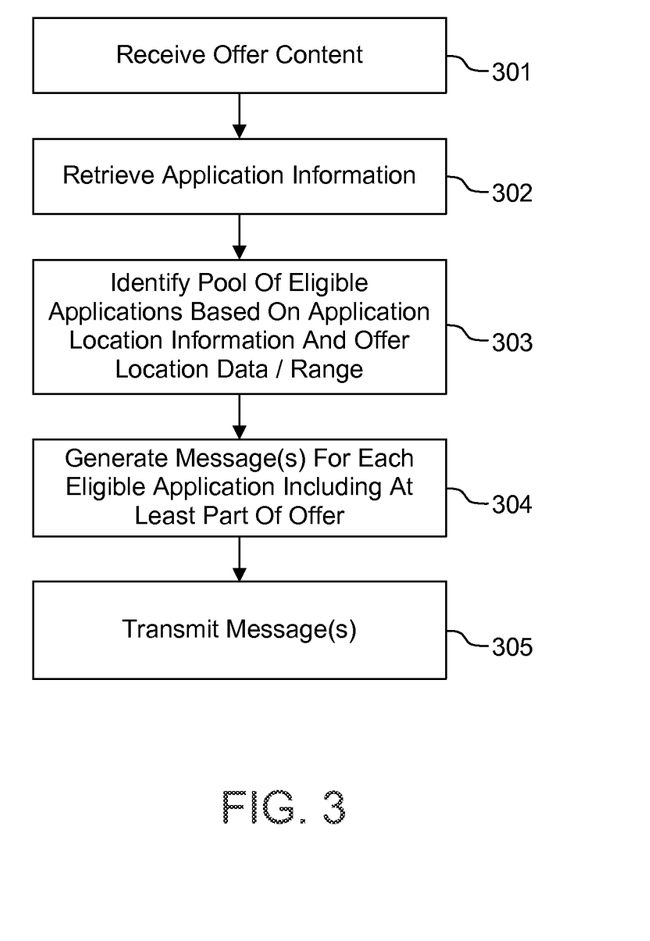
FIG. 3 is a flowchart illustrating the steps for providing location-based distribution of data according to an exemplary embodiment.

FIG. 3 is a flowchart illustrating the steps for providing location-based distribution of data according to an exemplary embodiment.

In one example embodiment, one or more sets of data including a location data and a range are received from partner systems. In particular, in this embodiment, the plurality of applications are wallet client applications on mobile devices (e.g., wallet client application 125-1 on mobile device 120-1), the partner systems are merchant systems (e.g., merchant system 140-1) managed by corresponding merchants, and the one or more sets of data include offer content. For example, the offer content may include an offer of goods or services and may be redeemed within a predetermined period of time.

In more detail, in step 301, offer content is received and stored. Specifically, wallet server system 170 stores one or more sets of data received from one of a plurality of partner systems 140-1, each set of data including at least one of a location data and a range. For example, wallet server system 170 receives offer content generated by a merchant system 140-1, and stores it in database 277. As shown above in Table 1, the offer content may include, for example, an Internal ID, a Merchant Offer ID, a Merchant Defined Location Data and Associated Range, Offer Content (e.g., the actual offer or discount, such as "30% off laptop computers"), Local Specific Store Data, and a Use Case.

In step 302, wallet server system 170 retrieves information in its database 277 corresponding to the wallet client application devices or systems managed by wallet server system 170, and in particular application information which includes, for example, application location information identifying the location of the corresponding mobile device. As mentioned above, mobile devices 120 may periodically transmit location data obtained by, e.g., communication with a GPS satellite or RF location methods to wallet server system 170, or wallet server system 170 may query for such information. Thus, there is retrieval of application information associated with each application of a plurality of applications stored on respective mobile devices, the application information including at least application location information.

In step 303, wallet server system 170 identifies a pool of eligible applications from the plurality of applications, based on the application location information of each of the plurality of applications and at least one of the location data and range of one of the one or more sets of data in the received offer content. As described above with respect to FIG. 2, the location data and range of each set of data (e.g., offer) can be defined by the respective merchant system 140-1, the location data can be specific coordinates indicating where the set of data may be used (e.g., redeemed), and the range can be predetermined area relative to the location (e.g., 20 miles). The application location information includes location information about the corresponding wallet client application 125, such as at least one of a zip code in which wallet client application 125-1 and/or mobile device 120-1 is located. Accordingly, it is possible to identify the eligible application/mobile devices by, for example, determining whether the application location information falls within the range defined by the merchant system 140-1 in the set of data (e.g., in the offer).

In step 304, a message is generated for each of the applications in the pool of eligible applications, the message including at least a portion of the one of the one or more sets of data (e.g., the offer). As described above with respect to FIG. 2, for example, an offer message 258 may include at least a message body, a first link for enabling online purchasing of the merchant identified product (including, e.g., the Merchant Offer ID from Table 1) and an optional second link for retrieving location information that identifies where use of the offer is valid for in-store use (e.g., stores corresponding to the "Local Specific Store Data" in Table 1).

Thus, a merchant enabled offer can be pushed, in a batch process for either a specific location area, regionally, or nationwide, to wallet client applications. The offer includes content that enables logic in the wallet client application to display the offer with a selectable payment item that indicates that payment is for online purchase only, and an optional and selectable item for retrieving a map and displaying on the map store locations where the merchandise can be purchased in-store.

In step 305, the respective message(s) are transmitted, over a communications network, to the applications in the pool of eligible applications. Thus, referring back to the example in FIG. 1, the offer message is transmitted from wallet server system 170 in MoCom platform 130, across communication network 150, to mobile devices 120-1, 120-2 . . . 120-n, as applicable.

The mobile device, e.g., mobile device 120-1, receives the message, and, in one example embodiment, displays a user interface based on the message.

Figure 4:
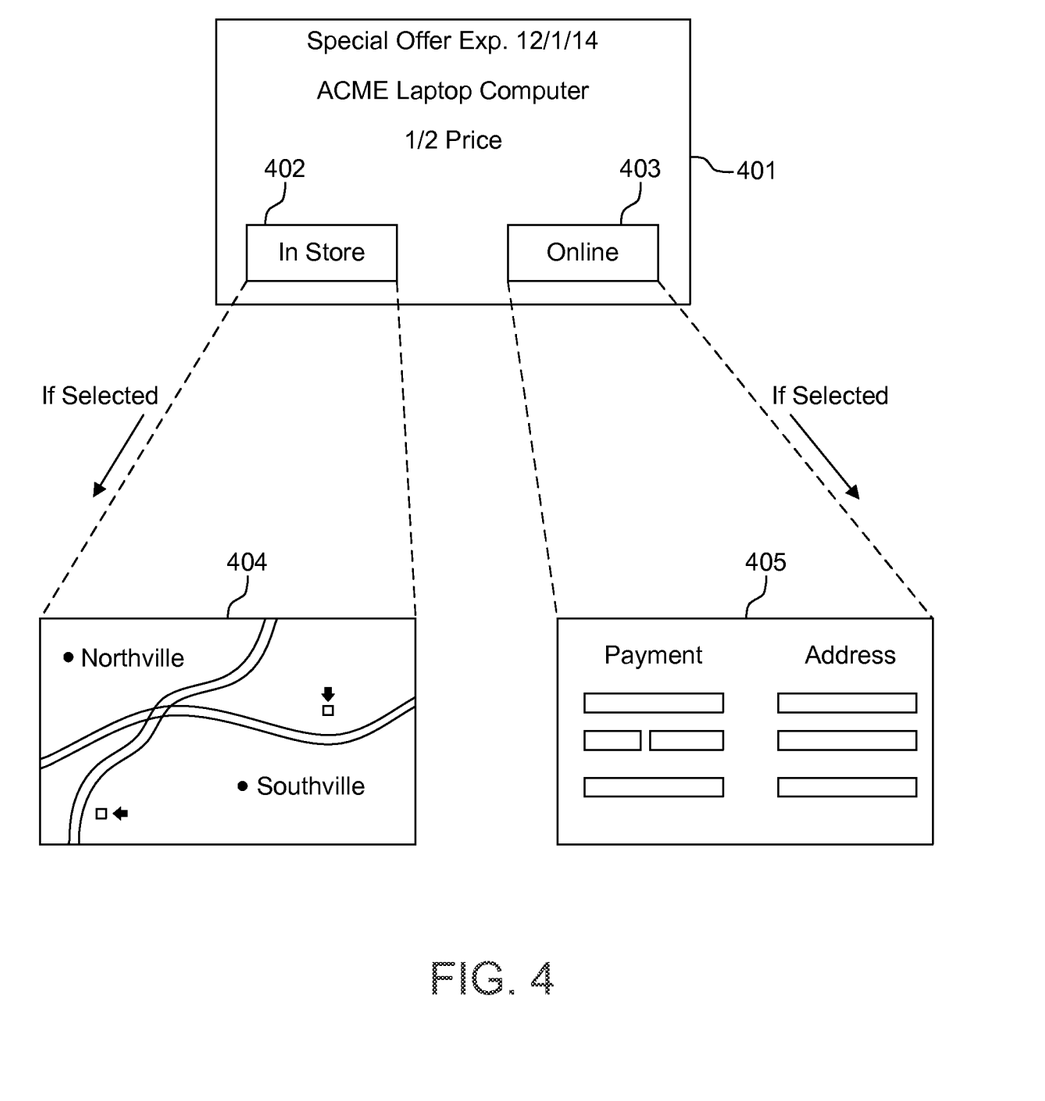
FIG. 4 is a view for illustrating location-based distributed data displayed on a mobile device according to an exemplary embodiment.

FIG. 4 is a view for illustrating location-based distributed data displayed on a mobile device according to an exemplary embodiment.

As shown in FIG. 4, user interface 401 displays information about an offer, such as the subject of the offer and the expiration date. As shown in FIG. 4, user interface 401 also displays selectable "In Store" object 402, and selectable "Online" object 403.

Selection of the "In Store" object 402 loads and/or displays another user interface including, for example, a map of the location (e.g., a store) designated by the offer content. In some embodiments, this object 402 may only be present when the mobile device is in a relevant location determined by a physical address, such as zip code or coordinates from GPS services or from the designated location.

Selection of the "Online" object 403 loads and/or displays another user interface including information and/or options for purchasing online, and may link directly to a merchant's website. Thus, in one embodiment, the consumer UI feature (e.g., offer on a mobile device) may include embedded link data through which the offer content would redirect the consumer to the respective merchant's website which includes specific product information. In this embodiment, the purchase request message 250 would include the routing information and the offer identification information. The merchant then receives all the information necessary to procure necessary inventory from the designated location area to facilitate purchase.

In one example, the wallet client application logic, when triggered by actions of a user of the wallet client application to purchase the product online via object 403, automatically pulls up a shipping and billing address form 405 and automatically populates this information from pre-existing address information, if it exists, e.g. from a user profile associated with the wallet client application. Additionally, a Primary Account Number (PAN) identification data, e.g. a payment token, used to identify PAN data, or actual PAN data, may be retrieved from secure storage area, e.g. from a secure storage area of a Host Card Emulation (HCE) environment, SE storage environment, or a network centric secure storage area. The type of PAN data used and where it is stored may be implementation dependent, i.e. dependent for a particular wireless handset device and a particular service provider. For example, Softcard, Apple, and Google each have different methods of using wallet client payment credentials for online transactions.

In this embodiment, a request from the wallet client application 125-1 through the wallet client application interface 225 to the facility where PAN identification data is stored locally and/or securely, e.g. in storage area associated with NFC/SE 228 or HCE 227, requesting the data be made available to wallet client application 125-1. The PAN identification data may include the PAN, or an identifier of the PAN, the Card Verification Value (CVV), account holder name, expiration data, and any control data indicating the PAN data is for use for an online transaction. The wallet client application 125-1 then can generate the purchase request message 250 and have the message 250 routed to the appropriate destination. The ultimate destination being the merchant system where account information 252 is routed through a payment gateway to an appropriate payment network for transferring funds and offer identification information 251 can be used to have merchant inventory moved from a particular location to the consumer.

It should be understood that the user interfaces and information shown in FIG. 4 are merely examples, and that various other types of interfaces and information could be displayed.

Example Computer-Readable Medium Implementations

The example embodiments described above such as, for example, the systems and procedures depicted in or discussed in connection with FIGS. 1-4 or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Figure 5:
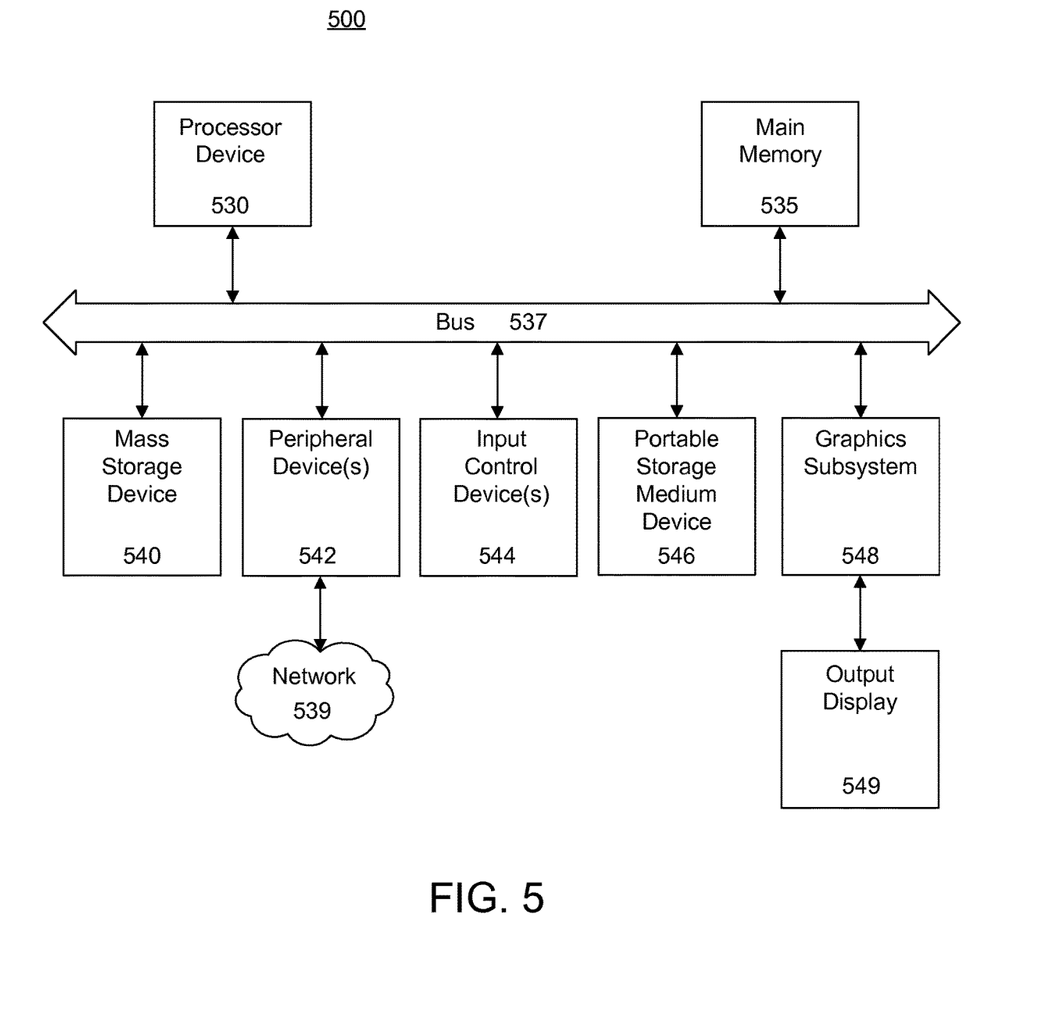
FIG. 5 is a block diagram of a general or special purpose computer.

FIG. 5 is a block diagram of a general and/or special purpose computer 500, which may be a general and/or special purpose computing device, in accordance with some of the example embodiments of the invention. The computer 500 may be, for example, a user device, a user computer, a client computer and/or a server computer, among other things.

The computer 500 may include without limitation a processor device 530, a main memory 535, and an interconnect bus 537. The processor device 530 may include without limitation a single microprocessor, or may include a plurality of microprocessors for configuring the computer 500 as a multi-processor system. The main memory 535 stores, among other things, instructions and/or data for execution by the processor device 530. The main memory 535 may include banks of dynamic random access memory (DRAM), as well as cache memory.

The computer 500 may further include a mass storage device 540, peripheral device(s) 542, portable non-transitory storage medium device(s) 546, input control device(s) 544, a graphics subsystem 548, and/or an output display 549. For explanatory purposes, all components in the computer 500 are shown in FIG. 5 as being coupled via the bus 537. However, the computer 500 is not so limited. Devices of the computer 500 may be coupled via one or more data transport means. For example, the processor device 530 and/or the main memory 535 may be coupled via a local microprocessor bus. The mass storage device 540, peripheral device(s) 542, portable storage medium device(s) 546, and/or graphics subsystem 548 may be coupled via one or more input/output (I/O) buses. The mass storage device 540 may be a nonvolatile storage device for storing data and/or instructions for use by the processor device 530. The mass storage device 540 may be implemented, for example, with a magnetic disk drive or an optical disk drive. In a software embodiment, the mass storage device 540 is configured for loading contents of the mass storage device 540 into the main memory 535.

The portable storage medium device 546 operates in conjunction with a nonvolatile portable storage medium, such as, for example, a compact disc read only memory (CD-ROM), to input and output data and code to and from the computer 500. In some embodiments, the software for storing information may be stored on a portable storage medium, and may be inputted into the computer 500 via the portable storage medium device 546. The peripheral device(s) 542 may include any type of computer support device, such as, for example, an input/output (I/O) interface configured to add additional functionality to the computer 500. For example, the peripheral device(s) 542 may include a network interface card for interfacing the computer 500 with a network 439.

The input control device(s) 544 provide a portion of the user interface for a user of the computer 500. The input control device(s) 544 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 500 may include the graphics subsystem 548 and the output display 549. The output display 549 may include a cathode ray tube (CRT) display and/or a liquid crystal display (LCD). The graphics subsystem 548 receives textual and graphical information, and processes the information for output to the output display 549.

Each component of the computer 500 may represent a broad category of a computer component of a general and/or special purpose computer. Components of the computer 500 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further include software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments, but should be defined only in accordance with the following claims and their equivalents.

In addition, it should be understood that the accompanying figures are presented for example purposes only. The architecture of the example embodiments presented herein is sufficiently flexible and configurable, such that it may be utilized and navigated in ways other than that shown in the accompanying figures. Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system to automatically provide location-based distribution of online and in-store offers, comprising:
   at least one memory operable to store one or more offers received from a merchant system, each offer including an offer location, an associated offer range, and one or more merchant applications associated with the one or more offers;
   an interface to communicate with the merchant system; and
   a processor communicatively coupled to the memory and the interface, the processor being operable to:
      identify one or more applications stored on a user mobile computing device;
      match the one or more applications stored on the user mobile computing device with the one or more merchant applications;
      automatically generate a message, wherein automatically generating a message comprises:
         receiving, from the user mobile computing device, data to determine a location of the user mobile computing device;
         calculating a distance between the user mobile computing device and each offer location;
         adding at least one respective offer of the offers to the message;
         adding a first link to the message, the first link to obtain routing information for routing the message over a secure transport channel for an online purchase option associated with at least the one respective offer;
         comparing the location of the user mobile computing device with an offer location associated with the one respective offer to determine whether the at least one respective offer is located within the associated offer range based on the distance between the user mobile computing device and the offer location for each of the one or more applications stored on the user mobile computing device which match the one or more merchant applications;
         in response to determining that the at least one respective offer is located within the associated offer range generate a map for the at least one respective offer:
            generating a map for the at least one respective offer;
            adding a second link to the message, wherein the second link includes a selectable item that retrieves the map displaying the offer location of the one or more eligible offers; and
      transmit, over a communications network, instructions to cause the user mobile computing device to display the message for at least one offer in the one or more offers.

2. The system according to claim 1, wherein the one or more applications are mobile wallet client applications.

3. The system according to claim 1, wherein the one or more offers include an offer of goods or services and may be redeemed within a predetermined period of time.

4. The system according to claim 1, wherein the offer location and the associated offer range are defined by the merchant system, the offer location being coordinates indicating where a respective offer may be redeemed, and the associated offer range being a predetermined area relative to the offer location.

5. The system according to claim 1, wherein the data includes at least one of a zip code in which the user mobile computing device is located.

6. The system of claim 1, wherein:
   the routing information identifies application resource management interfaces from at least one of the merchant system or the system to automatically provide location-based distribution of online and in-store offers.

7. A method to automatically provide location-based distribution of online and in-store offers, comprising:
   by one or more computing devices:
      storing one or more offers received from a merchant system, each offer including an offer location, an associated offer range, and one or more merchant applications associated with the one or more offers;
      identifying one or more applications stored on a user mobile computing device;
      matching the one or more applications stored on the user mobile computing device with the one or more merchant applications;
      automatically generate a message, wherein automatically generating a message comprises:
         receiving, from the user mobile computing device, data to determine a location of the user mobile computing device;
         calculating a distance between the user mobile computing device and each offer location;
         adding at least one respective offer of the offers to the message;
         adding a first link to the message, the first link to obtain routing information for routing the message over a secure transport channel for an online purchase option associated with at least the one respective offer;
         comparing the location of the user mobile computing device with an offer location associated with the one respective offer to determine whether the at least one respective offer is located within the associated offer range based on the distance between the user mobile computing device and the offer location for each of the one or more applications stored on the user mobile computing device which match the one or more merchant applications;
         in response to determining that the at least one respective offer is located within the associated offer range generate a map for the at least one respective offer, generating a map for the one or more eligible offers;
      adding a second link to the message, wherein the second link includes a selectable item that retrieves the map displaying the offer location of the one or more eligible offers; and
      transmitting, over a communications network, instructions to cause the user mobile computing device to display the message for at least one offer in the one or more offers.

8. The method according to claim 7, wherein the one or more applications are mobile wallet client applications.

9. The method according to claim 7, wherein the one or more offers include an offer of goods or services and may be redeemed within a predetermined period of time.

10. The method according to claim 7, wherein the offer location and the associated offer range are defined by the merchant system, the offer location being coordinates indicating where a respective offer may be redeemed, and the associated offer range being a predetermined area relative to the offer location.

11. The method according to claim 7, wherein the data includes at least one of a zip code in which the user mobile computing device is located.

12. The method of claim 7, wherein:
the routing information identifies application resource management interfaces from at least one of the merchant system or the one or more computing devices.

13. A computer program product, comprising:
a non-transitory computer-readable storage medium having computer-executable program instructions embodied thereon that when executed by a computer cause the computer to provide location-based distribution of online and in-store offers, the computer-executable program instructions comprising instructions to:
store one or more offers received from a merchant system, each offer including at least an offer location, an associated offer range, and one or more merchant applications associated with the one or more offers;
identify one or more applications stored on a user mobile computing device;
match the one or more applications stored on the user mobile computing device with the one or more merchant applications;
automatically generate a message, wherein automatically generating a message comprises:
receiving, from the user mobile computing device, data to determine a location of the user mobile computing device;
calculating a distance between the user mobile computing device and each offer location;
adding at least one respective offer of the offers to the message;
adding a first link to the message, the first link to obtain routing information for routing the message over a secure transport channel for an online purchase option associated with at least the one respective offer;
comparing the location of the user mobile computing device with an offer location associated with the one respective offer to determine whether the at least one respective offer is located within the associated offer range based on the distance between the user mobile computing device and the offer location for each of the one or more applications stored on the user mobile computing device which match the one or more merchant applications;
in response to determining that the at least one respective offer is located within the associated offer range generate a map for the at least one respective offer:
generating a map for the at least one respective offer;
adding a second link to the message, wherein the second link includes a selectable item that retrieves the map displaying the offer location of the one or more eligible offers; and
transmit, over a communications network, instructions to cause the user mobile computing device to display the message for at least one offer in the one or more offers.

14. The computer program product of claim 13, wherein the one or more applications are mobile wallet client applications.

15. The computer program product of claim 13, wherein the one or more offers include an offer of goods or services and may be redeemed within a predetermined period of time.

16. The computer program product of claim 13, wherein the offer location and the associated offer range are defined by the merchant system, the offer location being coordinates indicating where a respective offer may be redeemed, and the associated offer range being a predetermined area relative to the offer location.

17. The computer program product of claim 13, wherein the data includes at least one of a zip code in which the user mobile computing device is located.

18. The computer program product of claim 13
the routing information identifies application resource management interfaces from at least one of the merchant system or the computer.

* * * * *